(12) United States Patent
McManus et al.

(10) Patent No.: US 8,064,616 B2
(45) Date of Patent: Nov. 22, 2011

(54) INFOTAINMENT SYSTEM WITH SURROUND SOUND MEDIA NAVIGATION

(75) Inventors: Michael McManus, Oakdale, PA (US); Larry Vincent Craig, Plymouth, MI (US); Jeff Senn, Pittsburgh, PA (US); Jeremy Koempel, Pittsburgh, PA (US)

(73) Assignee: Panasonic Automotive Systems Company of America, Peachtree City, GA (US)

( * ) Notice: Subject to any disclaimer, the term of this patent is extended or adjusted under 35 U.S.C. 154(b) by 596 days.

(21) Appl. No.: 12/316,360

(22) Filed: Dec. 9, 2008

(65) Prior Publication Data

US 2010/0142724 A1    Jun. 10, 2010

(51) Int. Cl.
    *H04B 1/00* (2006.01)
(52) U.S. Cl. ............................................. 381/86
(58) Field of Classification Search .............. 381/86; 345/173; 715/717; 348/E5.128, 837, E5.122; 386/E5.003; 725/26, 74–77
    See application file for complete search history.

(56) References Cited

U.S. PATENT DOCUMENTS

| | | | | |
|---|---|---|---|---|
| 2006/0184968 A1* | 8/2006 | Clayton et al. | ................... | 725/56 |
| 2007/0011705 A1* | 1/2007 | Tsuria et al. | ................... | 725/46 |
| 2008/0215169 A1* | 9/2008 | deBettencourt et al. | ........ | 700/94 |
| 2009/0119721 A1* | 5/2009 | Perlman et al. | ................. | 725/76 |
| 2009/0138920 A1* | 5/2009 | Anandpura | ..................... | 725/76 |
| 2009/0228908 A1* | 9/2009 | Margis et al. | ..................... | 725/6 |

* cited by examiner

*Primary Examiner* — Dao H Nguyen
*Assistant Examiner* — Tram H Nguyen
(74) *Attorney, Agent, or Firm* — Laurence S. Roach

(57) ABSTRACT

An infotainment system is for a vehicle having a body defining an interior space. The infotainment system includes a playback device receiving and processing a plurality of sets of infotainment data. The infotainment data is organized in a hierarchy. The playback device transmits a plurality of sound signals. Each sound signal corresponds to a respective one of the sets of infotainment data. A plurality of speakers are communicatively coupled to the playback device. Each speaker is disposed at a different respective location within the interior space. Each of the speakers is adapted to receive a respective one of the sound signals and convert the respective sound signal into a corresponding audible sound. A user interface is communicatively coupled to the playback device. The user interface enables a user to navigate between levels of the hierarchy of infotainment data by making selections. Each of the selections corresponds to a respective one of the sets of infotainment data.

19 Claims, 12 Drawing Sheets ial manner.

INFOTAINMENT SYSTEM WITH SURROUND SOUND MEDIA NAVIGATION

BACKGROUND OF THE INVENTION

1. Field of the Invention

The present invention relates to infotainment (i.e., information/entertainment) systems for vehicles and, more particularly, the infotainment systems capable of receiving, processing and navigating multiple forms of infotainment media.

2. Description of the Related Art

Vehicles are typically equipped with an infotainment system capable of receiving infotainment media, such as radio signals, music files stored on a compact disc, music files stored on an MP3 device, music and video files stored on a digital video disc, and navigational information including map files and radio frequency signals provided by a global positioning system (GPS). Many of these infotainment systems are capable of receiving and processing multiple forms of infotainment media. For instance, a vehicle infotainment system might include any combination of a radio receiver for receiving broadcast radio signals, a satellite radio receiver for receiving satellite radio signals, a compact disc player, a digital video disc player and an MP3 port for linking to an MP3 storage device. The infotainment system provides the user with in-vehicle infotainment derived from these infotainment media.

In order to enable a user to select the type of infotainment medium, such infotainment systems are equipped with a user interface in the form of a visual display and multiple buttons. The visual display informs the user as to which infotainment medium is being engaged and additional information regarding that medium. To change infotainment media (such as between radio and CD) and/or select infotainment data within that media (such as a particular song on the CD), the user typically disrupts his/her visual attention from the road and views the visual display. The user then finds the button pertaining to the infotainment media of choice (e.g., the CD Player) and views the display to determine which infotainment data (e.g., which CD in the CD Player) he/she wishes to enjoy. The user may again disrupt his/her visual attention to view the display and determine which data (e.g., which song on the CD) is currently playing and select the data of choice. Accordingly, the user takes his/her eyes off of the road frequently to operate the infotainment system and navigate through the available infotainment media and data.

SUMMARY

The present invention provides an infotainment system that may be capable of receiving, providing and navigating multiple forms of infotainment media. The infotainment system may include a console that receives, stores and processes infotainment media. The infotainment media may include a plurality of infotainment data organized in a hierarchical manner. A plurality of speakers is communicatively coupled to the console and disposed in a spaced apart arrangement in the vehicle. Each of the plurality of speakers is adapted to broadcast a sound in a different area of the interior space of the vehicle. A user interface is communicatively coupled to the console. The console transmits a sound signal corresponding to one of the infotainment data to each of the plurality of speakers. The console is adapted such that the sound signal transmitted to each of the plurality of speakers is capable of corresponding to a different one of the infotainment data, such that the sound broadcast by each of the plurality of speakers corresponds to a different one of the infotainment data. The user interface enables a user to navigate through the infotainment media by selecting the sound. More particularly, the user interface may permit a user to select one of the plurality of infotainment media and infotainment data by scrolling through the sound broadcasted by each of the plurality of speakers. Thus, the present invention may present the user with a number of choices of infotainment data in a non-visual and exclusively audial manner.

In one embodiment, the present invention comprises an infotainment system for a vehicle having a body defining an interior space. The infotainment system includes a playback device receiving and processing a plurality of sets of infotainment data. The infotainment data is organized in a hierarchy. The playback device transmits a plurality of sound signals. Each sound signal corresponds to a respective one of the sets of infotainment data. A plurality of speakers are communicatively coupled to the playback device. Each speaker is disposed at a different respective location within the interior space. Each of the speakers is adapted to receive a respective one of the sound signals and convert the respective sound signal into a corresponding audible sound. A user interface is communicatively coupled to the playback device. The user interface enables a user to navigate between levels of the hierarchy of infotainment data by making selections. Each of the selections corresponds to a respective one of the sets of infotainment data.

In another embodiment, the present invention comprises an infotainment system including a playback device that processes a plurality of sets of infotainment data. The sets of infotainment data are organized in at least one specified order. The playback device simultaneously transmits first and second sound signals. The first sound signal corresponds to a first set of the infotainment data. The second sound signal corresponds to a second set of the infotainment data that is adjacent to the first set of infotainment data in the specified order. First and second speakers are communicatively coupled to the playback device and respectively receive the first and second sound signals and convert the first and second sound signals into first and second audible sounds. A user interface is communicatively coupled to the playback device and enables a user to provide feedback and thereby cause the playback device to subsequently simultaneously transmit the second sound signal and a third sound signal. The third sound signal corresponds to a third set of the infotainment data that is adjacent to the second set of infotainment data in the specified order. The second sound signal and the third sound signal are transmitted to the first speaker and the second speaker, respectively.

In yet another embodiment, the present invention comprises a method of providing infotainment data. A plurality of sets of infotainment data is organized into a matrix of the sets. The matrix has a plurality of rows and a plurality of columns. First and second sound signals are simultaneously transmitted to respective first and second speakers. The first sound signal corresponds to a first set of the infotainment data. The second sound signal corresponds to a second set of the infotainment data that is adjacent to the first set of infotainment data in one of the rows and columns. The speakers are used to convert the first and second sound signals into first and second audible sounds. A user listens to the first and second audible sounds and, in response thereto, provides user feedback to thereby cause subsequent simultaneous transmission of the second sound signal and a third sound signal. The third sound signal corresponds to a third set of the infotainment data that is adjacent to the second set of infotainment data in the one of the rows and columns. The second sound signal and the third sound signal are transmitted to the first speaker and the second speaker, respectively.

An advantage of the present invention is that the user is presented with choices of infotainment data, and the user may be able to select one or more of the choices without ever having to look away from the road he is driving on.

BRIEF DESCRIPTION OF THE DRAWINGS

The above mentioned and other features and objects of this invention, and the manner of attaining them, will become more apparent and the invention itself will be better understood by reference to the following description of an embodiment of the invention taken in conjunction with the accompanying drawings, wherein.

DETAILED DESCRIPTION

The embodiments hereinafter disclosed are not intended to be exhaustive or limit the invention to the precise forms disclosed in the following description. Rather the embodiments are chosen and described so that others skilled in the art may utilize its teachings.

Figure 1:
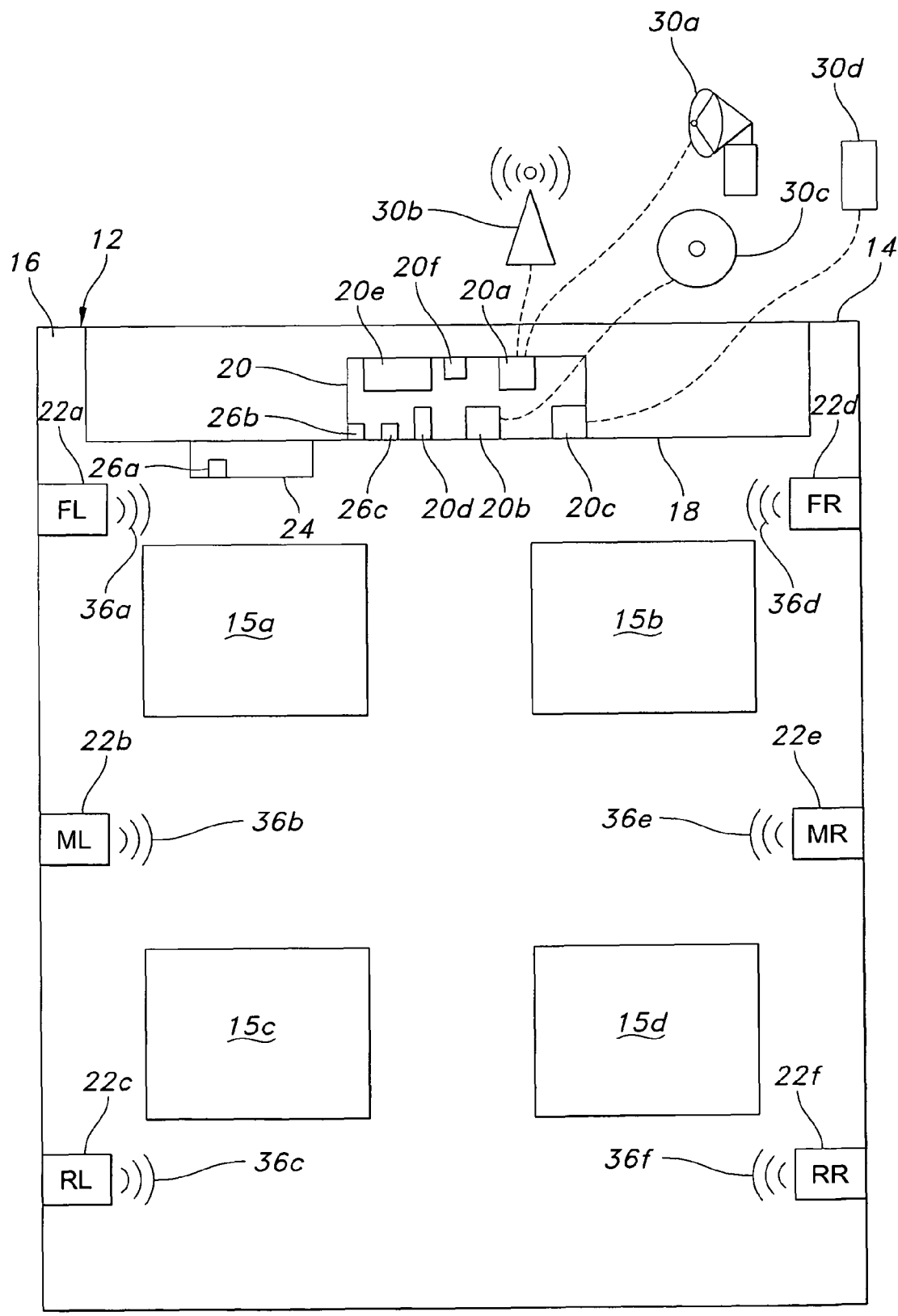
FIG. 1 is diagram of a vehicle equipped with an infotaimnent system in accordance with one embodiment of the present invention.

Referring first to FIG. 1, a vehicle 12 equipped with an infotainment system in accordance with one embodiment of the present invention is illustrated. Vehicle 12 generally includes vehicle body 14, which defines interior space 16. Vehicle 12 also includes seats 15a-15d positioned within interior space 16. Dashboard 18 is disposed within interior space 16 and extends along a front portion of the vehicle body 14. Steering wheel 24 extends from dashboard 18 and is positioned in front of seat 15a.

Vehicle 12 is equipped with an infotainment system, which generally includes console 20 mounted in dashboard 18, a plurality of speakers 22a-22f communicatively coupled to console 20 and user interface 26a-26c communicatively coupled to console 20. As described in further detail below, console 20 may be in the form of any infotaimnent console that is configured to receive and process infotainment media and transmit sound signals corresponding to the infotainment media and data to speakers 22a-22f. Console 20, as described in further detail below, is adapted such that console 20 may transmit a different sound signal to each of speakers 22a-22f.

Infotainment media may include any form of medium that is capable of storage or transmission of multiple infotainment data, such as radio signals and/or stored music files. For instance, as illustrated in FIG. 1, infotainment media may include satellite and/or broadcast radio transmissions 30a, 30b, which may include a plurality of infotainment data, such as a plurality of various satellite and/or broadcast radio stations. Infotainment media may also include devices for storing electronic infotainment data files, such as compact discs (CD), digital video discs (DVD), flash drives, MP3 storage devices and other media storage devices.

Accordingly, as depicted in FIG. 1, console 20 may include various playback devices 20a-f. More particularly, a playback device may be in the form of a receiver/tuner 20a that may tune into and receive satellite and/or broadcast radio signals 30a, 30b. Console 20 may also include a CD player component 20b adapted to hold and play a plurality of CDs 30c. Console 20 may include communication port 20c adapted to communicatively link to infotainment media, such as MP3 storage device 30d, and receive infotainment data stored thereon. Console 20 may be equipped with wireless communication device 20d capable of communicating with remote devices such as phones, computers and other devices.

Referring still to FIG. 1, console 20 may also include memory unit 20e, adapted to store information relating to infotainment media 30a-30d, such as radio station frequency/location information, radio station identification data, and metadata associated with any of the infotainment media or infotainment data. Memory unit 20e may be any known permanent or removable memory storage device, such as a hard drive, flash drive, etc. Console 20 may also include a processor component 20f, which is configured to process infotainment media 30a-30d and transmit to speakers 22a-22f sound signals corresponding to one or more of the plurality of infotainment data provided by the infotainment media.

Speakers 22a-22f are mounted in vehicle interior space 16 in an arrangement spaced apart from one another. Speakers 22a-22f are communicatively coupled to console 20 in any known manner, such as by a wired or wireless coupling. The infotainment system may include any number of speakers. For example, as shown in FIG. 1, the infotainment system may include six speakers 22a-22f including front left and right speakers 22a, 22d; middle left and right speakers 22b, 22e; and rear left and right speakers 22c, 22f. Each of speakers 22a-22f is adapted to project sounds 36a-36f, respectively, in the nearby area of interior space 16 of vehicle 12.

User interface 26a-26c is communicatively coupled to console 20 and may be in the form of one or more devices capable of receiving commands from a user and directing the operation of console 20. For instance, the user interface may be in the form of a button or buttons 26a, 26b located on steering wheel 24 and/or on console 20, respectively. Alternatively, or in addition, the user interface may include voice recognition device/microphone 26c. Alternatively, user interface 26a-c may be in the form of a roller ball, head motion sensor, multidirectional key pad, joystick, or other user interface device.

Figure 2:
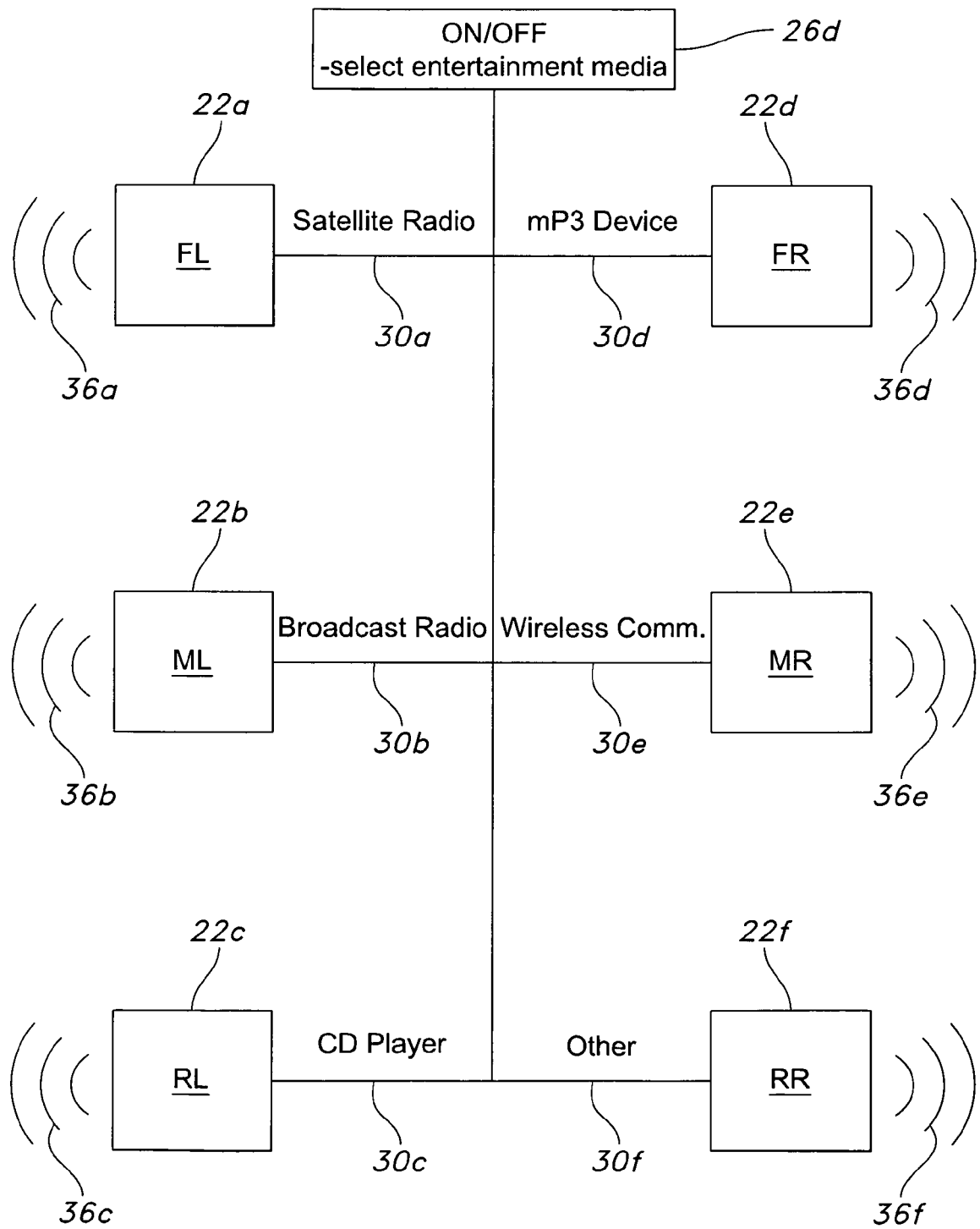
FIG. 2 is a diagram depicting one possible arrangement of output to the speakers of the system of FIG. 1.

Turning now to FIGS. 1, 2 and 3A-3C, one embodiment of operation of the infotainment system will now be described. First, as shown in FIGS. 1 and 2, the user may turn ON the infotainment system in a typical fashion such as by touching an on/off switch 26d associated with console 20. Receiver 20a receives satellite and broadcast radio transmissions 30a, 30b. If desired, the user inserts one or more CDs 30c into CD player 20b and/or couples MP3 player/storage device 30d to port 20c. Processor 20e of console 20 receives sets of information and/or infotainment data 34a-34f, 34aa-34af (FIGS. 3A-3B) from each of the available infotainment media 30a-30d. Processor 20e organizes sets of infotainment data 34a-34f, 34aa-34af in a hierarchical manner and presents the infotainment data 34a-34f, 34aa-34af in a hierarchical form to the user for selection, as is illustrated in FIGS. 2 and 3A-3C. In organizing infotainment data, processor 20e may store some or all of infotainment data 34a-34f, 34aa-34af in memory unit 20d.

The playback devices of console 20 present the infotainment data to the user by transmitting sound signals corresponding to the infotainment data to each of speakers 22a-22f (FIG. 1). For instance, as shown in FIG. 2, console 20 (FIG. 1) independently transmits sound signals relating to infotainment media 30a-30f to each of speakers 22a-22f. That is, console 20 (FIG. 1) transmits a sound signal relating to satellite radio 30a to front left speaker 22a; a sound signal relating to broadcast radio 30b to middle left speaker 22b, a sound signal relating to CD player 30c to rear left speaker 22c, a sound signal relating to MP3 storage device 30d to front right speaker 22d, a sound signal relating to wireless communication device 30e to middle right speaker 22e, and a sound signal from another infotainment medium to rear right speaker 22f. In turn, speakers 22a-22f simultaneously project different respective sounds 36a-36f, which correspond to infotainment media 30a-30f, respectively. The sound signals and the corresponding sounds 36a-36f may be in the form of any signals and sounds representative of the infotainment media. For instance, sounds 36a-36f may simply be different looped/repeating messages identifying the respective infotainment media, such as an audible message stating "this is satellite radio." As is illustrated in further detail below, sounds 36a-36f may take other audible forms such as representations of metadata, looped snippets of songs and/or other information relating to the corresponding infotainment media.

Using the user interface 26a-26c (FIG. 1), such as directional button 26a on steering wheel 24, the user can scroll through the various sounds 36a-36f being simultaneously emitted in interior space 16. As the user scrolls through sounds 36a-36f, individual ones of sounds 36a-36f may be sequentially highlighted. The sound that is currently highlighted is amplified relative to, i.e., is broadcast louder than, the other sounds coming from other speakers. When the user reaches, i.e., highlights, the sound representing the user's desired selection, the user may press the select button on user interface 26a. By simultaneously emitting different sounds into areas of interior space 16 and allowing the user to scroll through the sounds, the infotainment system creates the effect of a virtual three-dimensional audio library space in which numerous audio choices are available. The user browses the selection as if walking through the virtual space and passing each of the audio choices.

The present invention may include various techniques for virtual simulation of a three-dimensional audio library space. For example, the pitch of the individual elements may be Doppler shifted as they virtually approach the user or go away from the user. That is, the pitch of the individual elements may be higher as they seem to come closer to the user, and the pitch of the individual elements may be lower as they seem to go farther away from the user. Thus, the compression and decompression of sound waves that occurs in a real world environment is simulated. In another embodiment, the interior three-dimensional sound environment of the vehicle may be pre-computed in order to enable the computing processor to simulate various effects in real time and thereby heighten the audio illusion of movement of sources of sound.

Figure 3A:
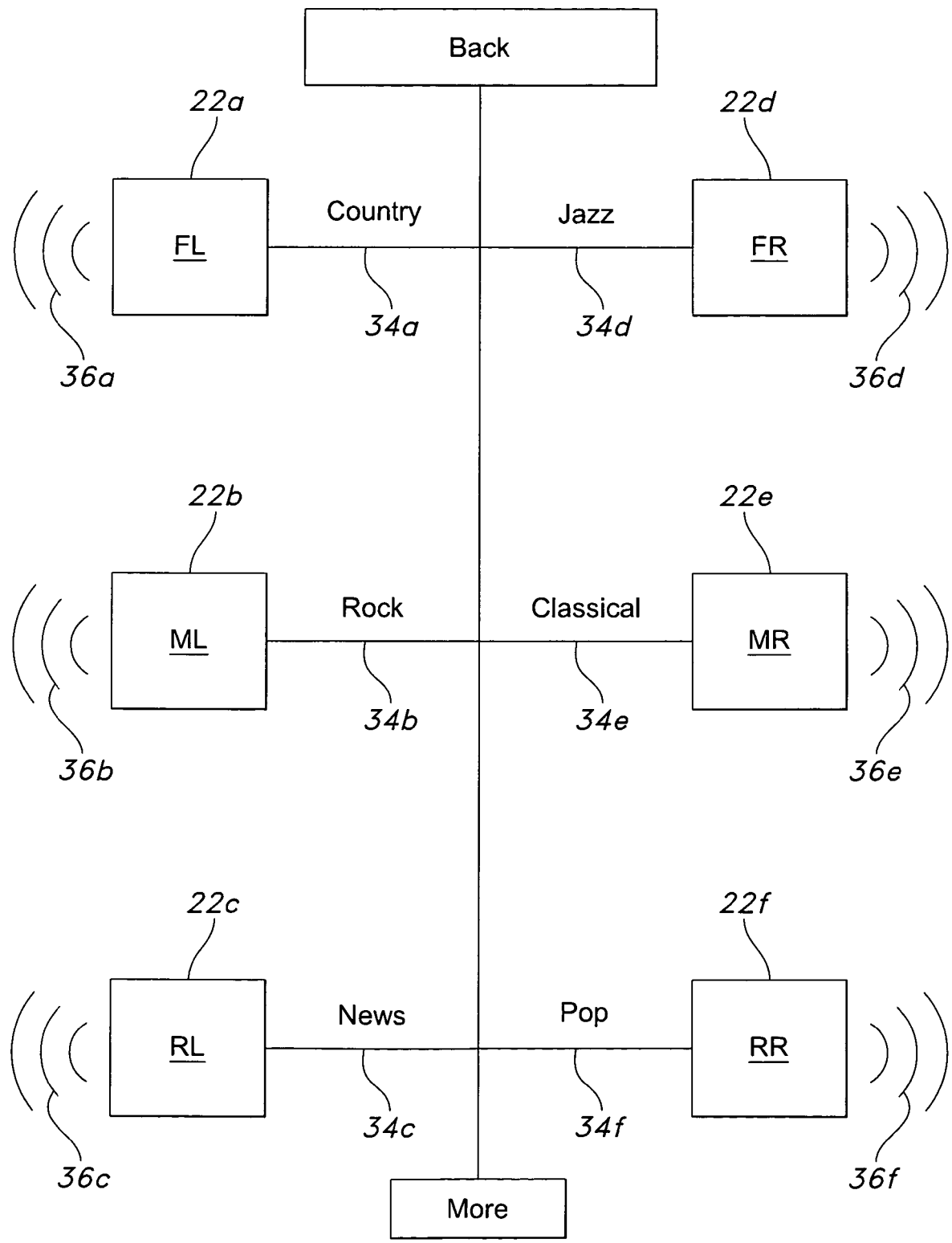
FIG. 3A is a diagram depicting one possible arrangement of output to the speakers of the system of FIG. 1 after a selection is made from the arrangement of FIG. 2.

Assuming that the user selects satellite radio 30a as the infotainment medium of choice, console 20 presents the user with another set of choices relating to infotainment data 34a-34f in the next lower level in the hierarchy, as shown in FIG. 3A. For instance, processor 20e (FIG. 1) may have organized or segregated the various available satellite stations by genre. In such case, the sound signal transmitted to each of speakers 22a-22f identifies each genre. For instances, speakers 22a-22f each independently play a respective audible looped message (sounds 36a-36f) identifying the genres as country 34a, rock 34b, news 34c, jazz 34d, classical 34e and pop 34f, respectively. These looped messages may be emitted into interior space 16 simultaneously. As the user scrolls through sounds 36a-36f, the user is presented with the available infotainment data 34a-34f, and the currently highlighted sound is amplified, i.e., played louder than the non-highlighted sounds. The user selects one of infotainment data 34a-34f by pressing the select button of user interface 26a (FIG. 1).

Figure 3B:
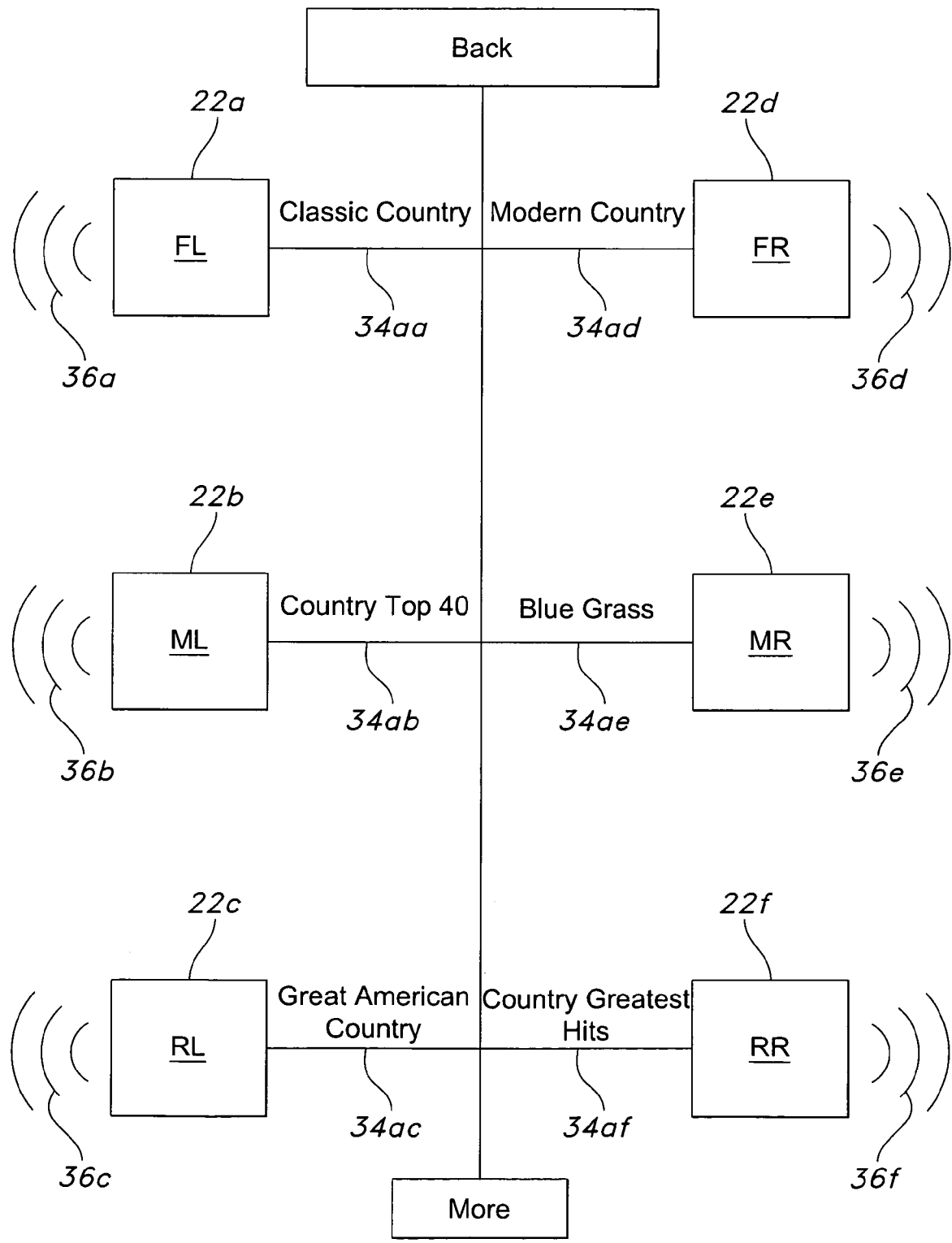
FIG. 3B is a diagram depicting one possible arrangement of output to the speakers of the system of FIG. 1 after a selection is made from the arrangement of FIG. 3A.

Referring to FIG. 3B, assume that the user selects set of infotainment data 34a, which represents the genre of Country in the satellite radio infotainment medium 30a. The user is then presented with another selection of choices relating to subsets of infotainment data 34aa-34af in the next lower level of the hierarchy. Console 20 (FIG. 1) sends sound signals to speakers 22a-22f relating to the satellite radio stations 34aa-34af categorized under the genre Country 34a. These sound signals cause speakers 22a-22f to emit respective sounds 36a-36f into interior space 16. Sounds 36a-36f may be looped messages of the station identification information. Alternatively, sounds 36a-36f may be sounds actually being transmitted by the satellite station, such as the song that is being played on, or broadcast from, that station. In still another alternative, sounds 36a-36f could be looped messages identifying the content of what is playing on that station, such as song title, artist, etc. For instance, as shown in FIG. 3B, sound 36a projected by front left speaker 22a may be a looped audible message identifying infotainment data 34aa as being broadcast from a Classic Country radio station. Sound 36b projected by the middle left speaker 22b may be a looped audible message identifying infotainment data 34ab as being broadcast from a Country Top 40 radio station. Sound 36c projected by rear left speaker 22c may be a looped audible message identifying infotainment data 34ac as being broadcast from a Great American Country radio station. Sounds 36ad, 36ae, 36af emitted respectively by front, middle and rear speakers 22d-22f may be audible looped messages identifying infotainment data 34ad-34af as being broadcast from Modern Country, Blue Grass and Country Greatest Hits radio stations, respectively. As the user scrolls through sounds 36a-36f, the sound that is highlighted via the scrolling is audibly amplified. The user makes a selection of a highlighted sound by pressing the select button on the user interface 26a (FIG. 1).

Figure 3C:
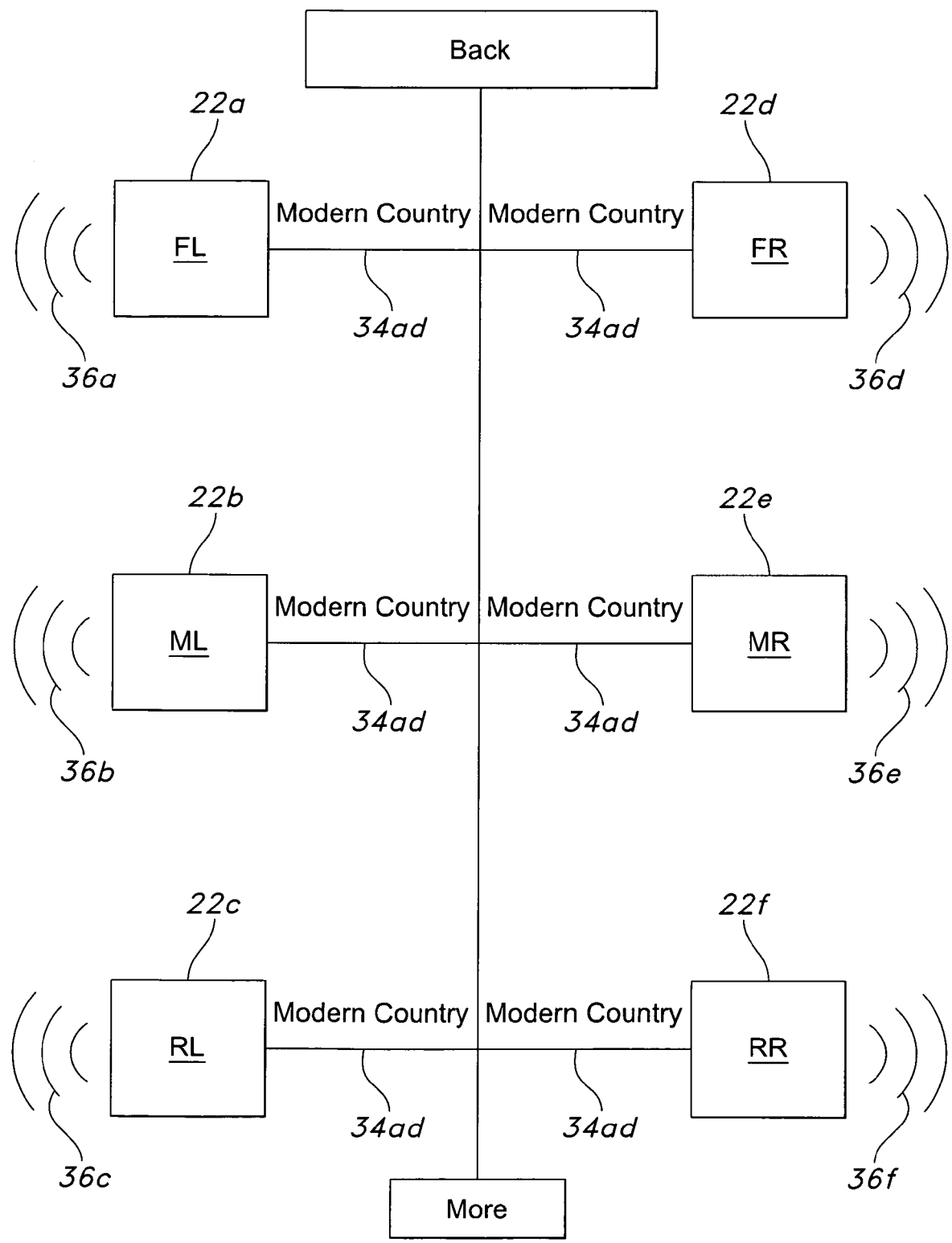
FIG. 3C is a diagram depicting one possible arrangement of output to the speakers of the system of FIG. 1 after a selection is made from the arrangement of FIG. 3B.

Turning now to FIG. 3C, the user has selected infotainment data 34ad, which is broadcast from the Modern Country satellite radio station. In response to the selection, console 20 now sends sound signals relating to infotainment data 34ad to each of speakers 22a-22f. Accordingly, sounds 36a-36f emitted by speakers 22a-22f are now all in the form of the audible representations of the satellite radio transmission from the Modern Country satellite station. The user can now make a final selection of one of sounds 36a-36f by highlighting the sound and pressing the select button on the user interface 26a. All of speakers 22a-f may then simultaneously emit sounds in accordance with the finally-selected sound, and the user may thereby listen to the final selection.

Figure 4A:
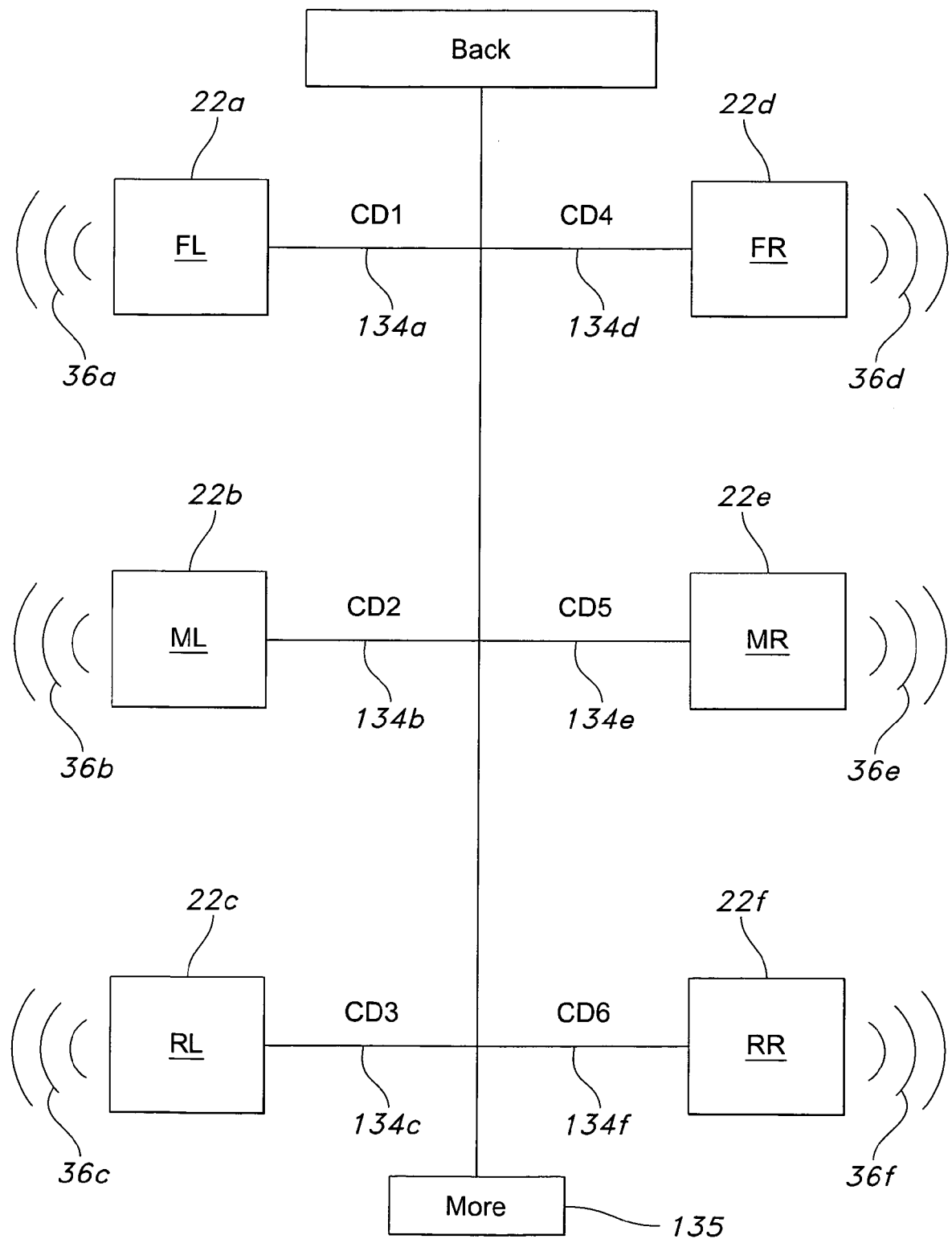
FIG. 4A is a diagram depicting one possible arrangement of output to the speakers of the system of FIG. 1 after a selection is made from the arrangement of FIG. 2.
Figure 4B:
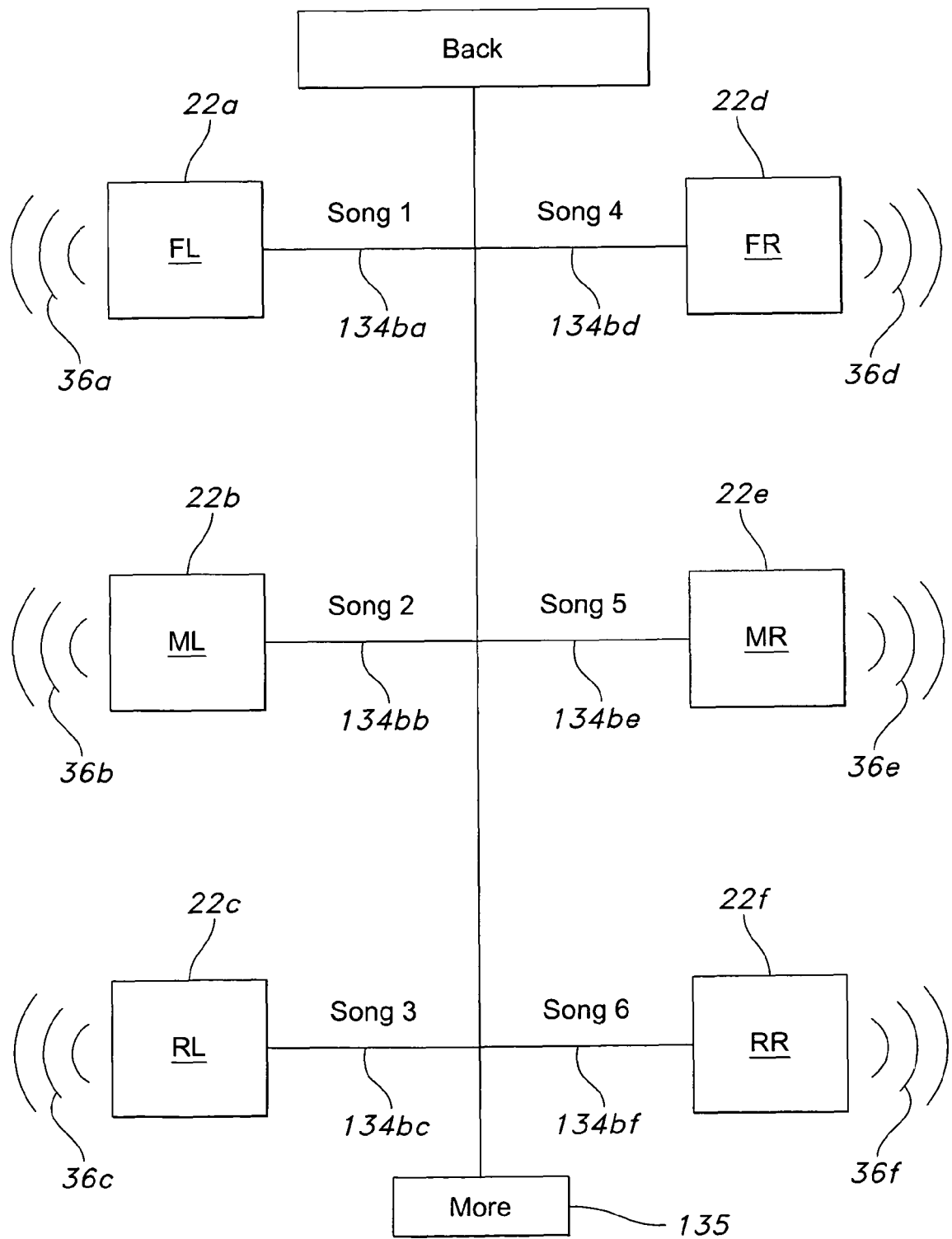
FIG. 4B is a diagram depicting one possible arrangement of output to the speakers of the system of FIG. 1 after a selection is made from the arrangement of FIG. 4A.
Figure 4C:
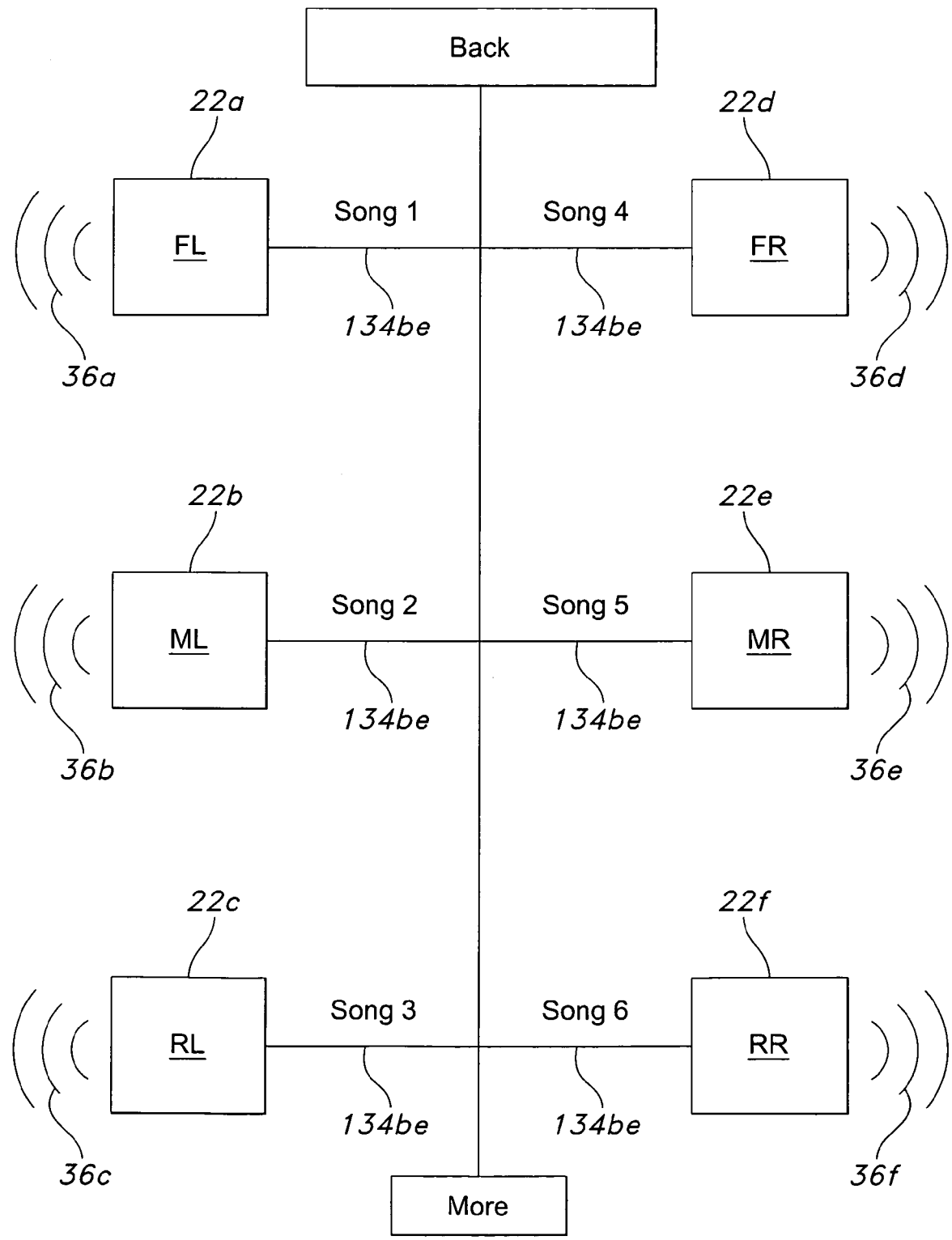
FIG. 4C is a diagram depicting one possible arrangement of output to the speakers of the system of FIG. 1 after a selection is made from the arrangement of FIG. 4B.

FIGS. 4A-4C depict a process of selecting another infotainment medium at the step in FIG. 2. More particularly, FIGS. 4A-4C depict a process following the selection of CD player/changer 30c (rather than satellite radio) at the stage in FIG. 2. As shown on FIG. 4A, once the user selects CD player/changer 30c (FIG. 2), a playback device of console 20 (FIG. 1) transmits a sound signal to each of speakers 22a-22f, respectively, relating to each of the CDs 134a-134f available, i.e., loaded, in the CD player. Speakers 22a-22f emit sounds 36a-36f, respectively, which respectively correspond to CDs 134a-134f. That is, front left speaker 22a emits sound 36a, which identifies CD1 134a. Middle and rear left speakers 22b, 22c emit sounds 36b, 36c, respectively, which identify CD2 134b and CD3 134c, respectively. Front right speaker 22d emits sound 36d, which identifies CD4 134d. Middle right speaker 22e emits sound 36e, which identifies CD5 134e. Rear right speaker 22f emits sound 36f, which identifies CD6 134f. Sounds 36a-36f may be in the form of audible representations of metadata on CD1-6 134a-134f identifying CD1-6 134a-134f. Alternatively, sounds 36a-36f may be in the form of the actual respective content of CD1-6 134a-134f, such as snippets and/or repeating loops of music.

The user scrolls through sounds 36a-36f using the interface 26a (FIG. 1) and the sound currently highlighted is amplified. The user selects the desired infotainment data 134a-134f by pressing the select button on user interface area 26a when the desired infotainment data is highlighted.

Turning to FIG. 4B, the user has selected CD2 134b. A playback device of console 20 (FIG. 1) now sends sound signals to speakers 22a-22f which pertain to the songs/infotainment data 134ba-134bf stored on CD2 134b. Speakers 22a-22f emit sounds 36a-36f relating to data 134ba-134bf, which may be metadata information relating to the song title. Alternatively, sounds 36a-36f may be the snippets of the songs. If there are more songs on CD2 134 than speakers 22a-22f, the user may be presented with a "more" option 135, which may be presented at the end of scrolling through data 134ba-134bf by reducing the loudness of all speakers 22a-22f. Alternatively, the "more" option could be represented by an audible message included in one or more of sounds 36a-36f. The "more" option may also be an additional selection button on user interface 26a. Assuming the user selects song 5 (data 134be), as shown in FIG. 4C, console 20 (FIG. 1) then causes song 5 to be emitted in sounds 36a-36f from all of speakers 22a-22f.

Figure 5:
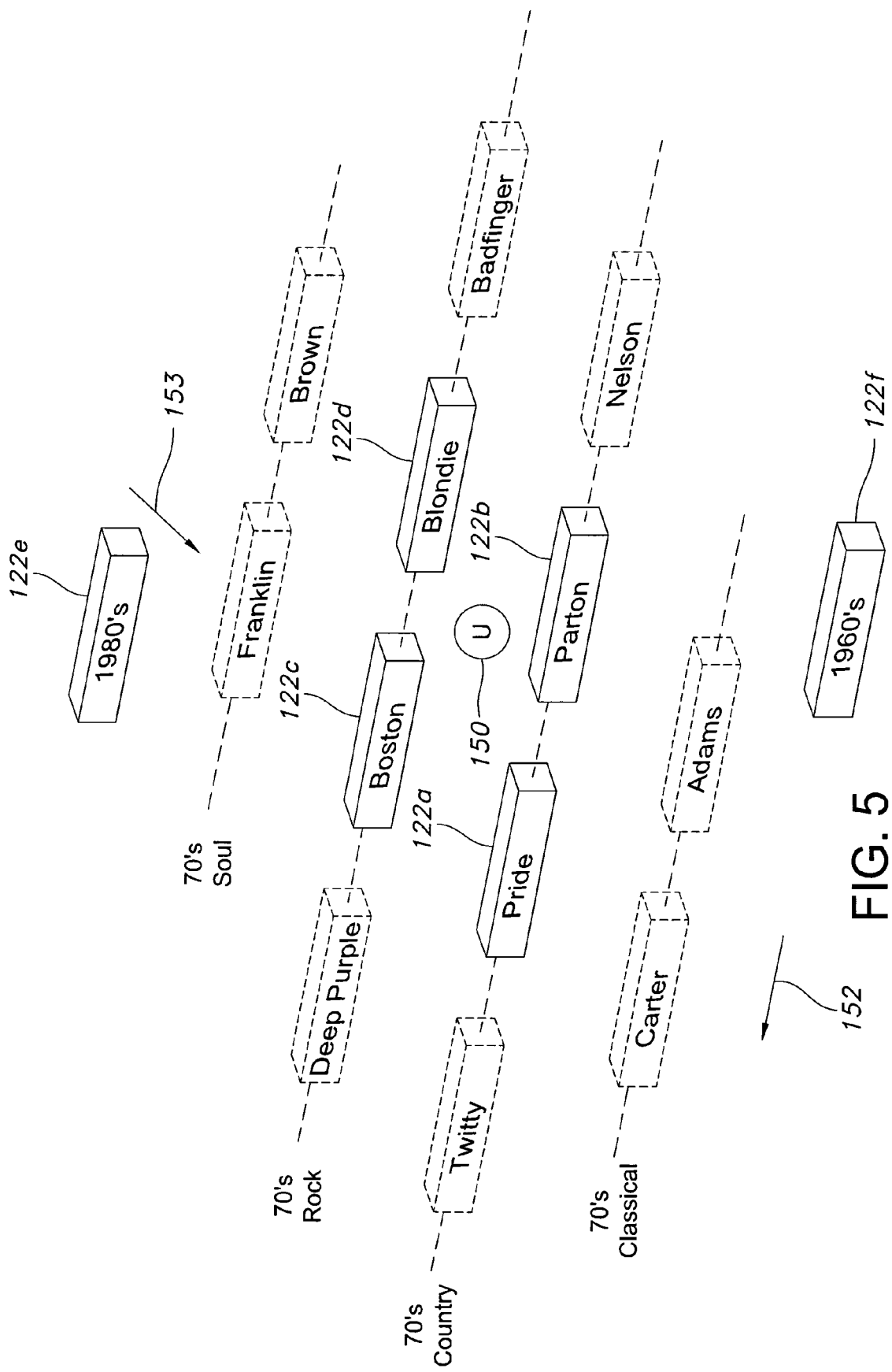
FIG. 5 is a schematic depiction of a three-dimensional matrix of infotainment data that may be emitted from speakers within a vehicle in accordance with another embodiment of the invention.

In another embodiment, illustrated in FIG. 5, a user 150 is surrounded by speakers 122a, 122b, 122c, and 122d that are on the same vertical level as user 150. In one particular embodiment, user 150 is the driver of a vehicle sitting in the driver's seat and facing in a forward direction indicated by arrow 152. Speaker 122a is disposed to the left and forward of driver 150, speaker 122b is disposed to the left and rearward of driver 150, speaker 122c is disposed to the right and forward of driver 150, and speaker 122d is disposed to the right and rearward of driver 150. Speakers 122e and 122f are on different vertical levels than driver 150. More particularly, speaker 122e is disposed above driver 150, such as in the roof of the vehicle, and speaker 122f is disposed below driver 150, such as in the floor of the vehicle. Speakers 122a-f may be positioned such that a typical driver 150 who has normal hearing abilities is able to discern from which of the six speakers 122a-f each of six respective simultaneous sounds is being emitted.

In the particular embodiment illustrated in FIG. 5, infotainment data stored in the vehicle includes songs that are segregated or categorized by genre, artist and decade. The song infotainment data may be organized in a virtual three-dimensional matrix wherein each vertical level represents a different decade. For example, in the state illustrated in FIG. 5, the vertical level above driver 150, emitted by speaker 122e, represents songs released in the 1980s; the vertical level below driver 150, emitted by speaker 122f, represents songs released in the 1960s; and the vertical level of driver 150, emitted by speakers 122a-d, represents songs released in the 1970s.

Within each vertical level of the matrix, the infotainment data may be organized into rows and columns. In the embodiment of FIG. 5, the driver's vertical level, i.e., the 1970s, is organized into columns aligned parallel to forward direction 152. Each column represents a different genre, such as Classical, Country, Rock and Soul. The columns may be in a specified order, such as alphabetically, as is the case in FIG. 5. Within each genre column, the infotainment data may be divided into sets representing particular artists. In the example illustrated in FIG. 5, the artists are listed in a specified order, e.g., alphabetically, within each genre column. Within this top level of the infotainment data hierarchy, the sounds from each speaker on the driver's vertical level may represent a respective artist, as in FIG. 5.

In a particular embodiment, a voice emitted from speaker 122e may say "nineteen eighties", and a voice emitted from speaker 122f may say "nineteen sixties", perhaps with a different tone of voice from that of speaker 122e in order to facilitate the user's recognition of the direction from which each voice is being emitted. Speaker 122a may emit a sound including a voice stating "Charlie Pride" and/or including a snippet of a popular song performed by Charlie Pride, or a song by Charlie Pride that has been selected by the user the most times in the past. Speakers 122b-d may emit equivalently formatted sounds corresponding to the particular artists indicated in FIG. 5. Further, the sounds from speakers 122a-b may include a voice stating "country", and the sounds from speakers 122c-d may include a voice stating "rock". Further still, the sounds from speakers 122a-d may include a voice stating "nineteen seventies". The sounds from speakers 122a-f may be emitted simultaneously, in some sequential order, or with some portions of the sounds being emitted simultaneously and other portions of the sounds being emitted in some sequential order.

Figure 6:
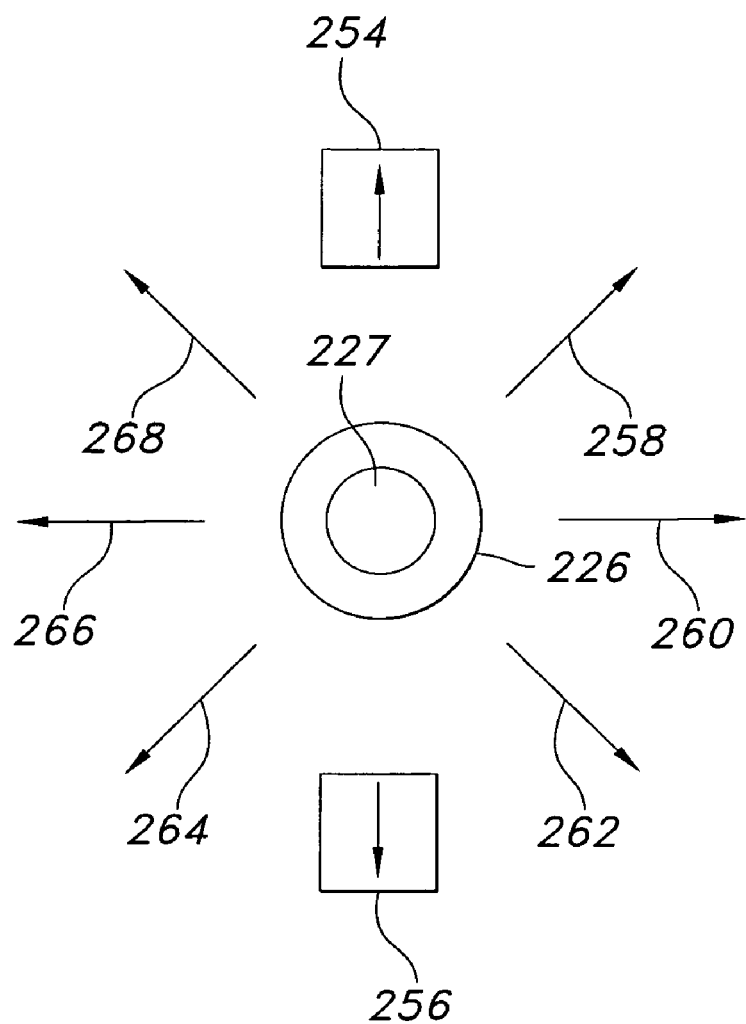
FIG. 6 is a top schematic view of one embodiment of a user interface device that may be used in conjunction with the embodiment of FIG. 5.

A user interface device in the form of a joystick 226 is illustrated in a schematic top view in FIG. 6. Joystick 226 may be used by the user to navigate through the matrices and hierarchy of the infotainment data. As is typical of joysticks, joystick 226 may be pivotable about its bottom end such that joystick 226 may be tilted in the directions of any of the eight arrows depicted in FIG. 6. Joystick 226 may also be provided with a pushbutton 227 at its top end that the user may press in order to highlight and/or select a set of infotainment data, as described in more detail below.

In a particular embodiment of using joystick 226 to navigate the infotainment data, joystick 226 may be tilted in the direction indicated by arrow 254 in order to be taken to the next upper vertical level, i.e., the 1980s level when in the state depicted in FIG. 5. Conversely, joystick 226 may be tilted in the direction indicated by arrow 256 in order to be taken to the next lower vertical level, i.e., the 1960s level.

Joystick 226 may be tilted in the directions of arrows 258, 260, 262, 264, 266 and 268 in order to navigate the infotainment data on the driver's current vertical level, i.e., the 1970s. Particularly, tilting in direction 258, which is to the right-hand side of driver 150, as is the virtual column of 1970s Rock, may cause the virtual column of 1970s Rock to advance in direction 152. That is, the resultant shifting of the virtual 1970s Rock column may cause speaker 122*c* to emit sounds corresponding to Deep Purple, and the sounds corresponding to Boston to shift to speaker 122*d*. Sounds associated with artists Pride and Parton may continue to be emitted from speakers 122*a*, 122*b*, respectively. Similarly, tilting in direction 262 may cause the virtual column of 1970s Rock to advance in the direction opposite to direction 152. That is, the resultant shifting of the virtual 1970s Rock column may cause speaker 122*d* to emit sounds corresponding to Badfinger, and the sounds corresponding to Blondie to shift to speaker 122*c*. In this case too, sounds associated with artists Pride and Parton may continue to be emitted from speakers 122*a*, 122*b*, respectively. Tilting joystick 226 in directions 268 and 264 may result in shifting of the 1970s Country virtual column in manners that are mirror images of the above-described shifting of the virtual column of 1970s Rock that result from tilting in directions 258, 262.

Tilting of joystick 226 in directions 258, 262, 264, 268 may be repeated by the user as many times as desired to thereby shift as many sound signals to the speakers as there are artists in the particular virtual columns of the infotaimnent database.

Tilting joystick 226 in the right-hand direction of arrow 260 or in the left-hand direction of arrow 266 may result in a shifting of the genre columns of the entire 1970s vertical level. Specifically, tilting in the right-hand direction of arrow 260 may result in the 1970s Soul column becoming aligned with speakers 122*c*-*d*, and the 1970s Rock column shifting over to speakers 122*a*-*b*. That is, tilting in direction 260 may result in speakers 122*c*-*d* emitting sounds corresponding to artists Franklin and Brown, respectively, and speakers 122*a*-*b* emitting sounds corresponding to artists Boston and Blondie, respectively. Conversely, tilting in the left-hand direction of arrow 266 may result in the 1970s Classical column becoming aligned with speakers 122*a*-*b*, and the 1970s Country column shifting over to speakers 122*c*-*d*. That is, tilting in direction 266 may result in speakers 122*a*-*b* emitting sounds corresponding to artists Carter and Adams, respectively, and speakers 122*c*-*d* emitting sounds corresponding to artists Pride and Parton, respectively.

Tilting of joystick 226 in directions 260, 266 may be repeated by the user as many times as desired to thereby shift as many sound signals to the speakers as there are musical genres in the infotainment database.

Pushbutton 227 may be depressed by the user simultaneously with the tilting of joystick 226 in one of directions 258, 262, 264, 268 in order to highlight a desired set of infotainment data. For example, in the state depicted in FIG. 5, a user may depress pushbutton 227 and tilt joystick 226 in direction 264 in order to highlight the sounds corresponding to Parton which are emitted from speaker 122*b*. By highlighting a particular sound, the highlighted sound may be emitted with a higher level of volume, i.e., loudness, than are the sounds emitted from the other speakers.

Pushbutton 227 may also be depressed in its upright, i.e., untilted, position in order to select a set of infotainment data that is currently highlighted. As an example, in the state depicted in FIG. 5, the user may depress pushbutton 227 while simultaneously tiling joystick 226 in one of directions 258, 262, 264, 268 in order to select one of the respective artists Boston, Blondie, Parton and Pride. The user may then select the artist by again depressing pushbutton 227, but this time while joystick 226 is in the upright position.

Figure 7:
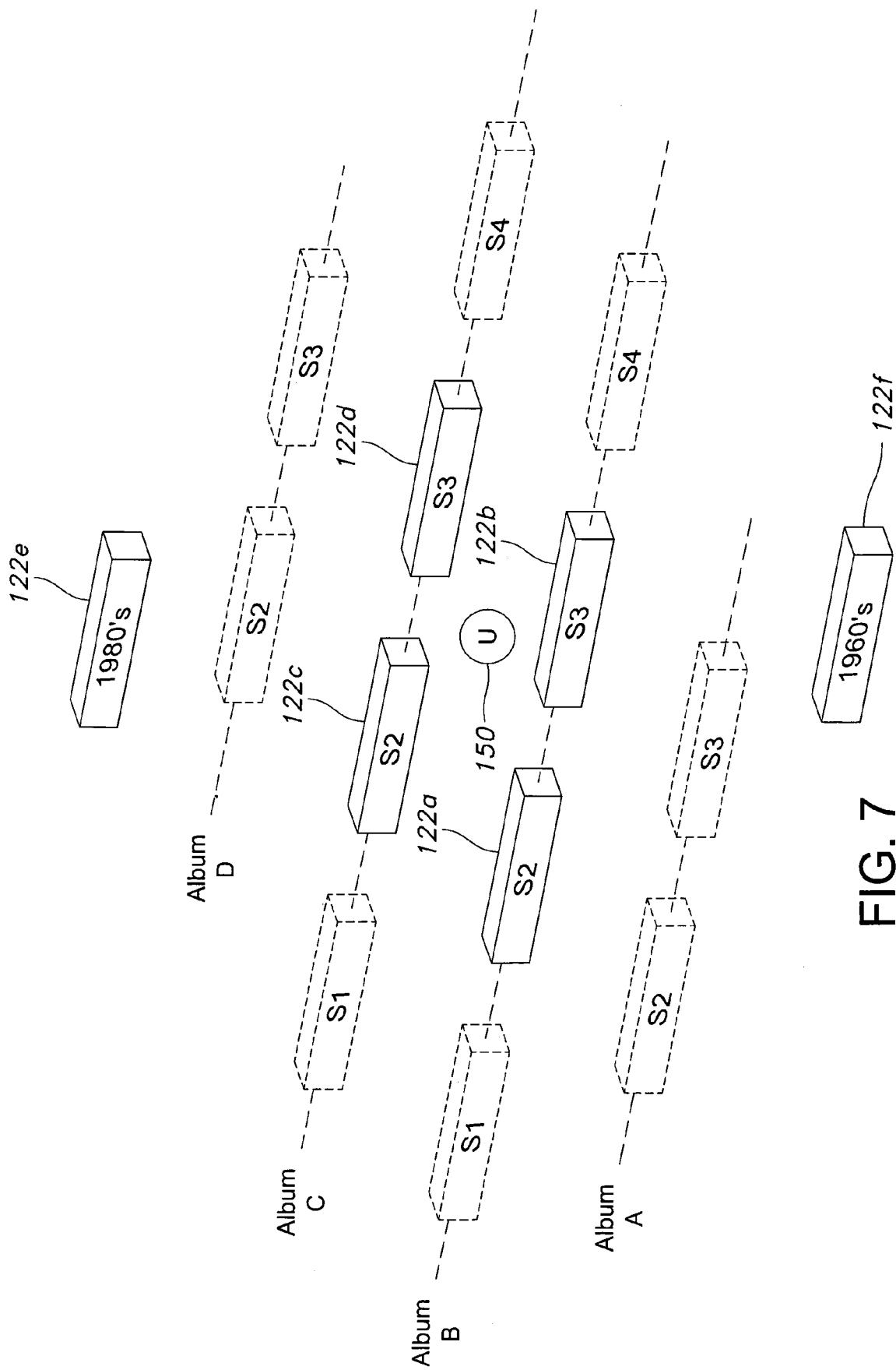
FIG. 7 is a schematic depiction of a three-dimensional matrix of infotainment data after a selection is made from the depiction of FIG. 5.

A result of selecting a particular artist, thus navigating to a next lower level of the infotainment data hierarchy, is depicted in FIG. 7. Particularly, the columns A-D on the user's vertical level of the resulting matrix of infotainment data may correspond to various albums, CDs, or other collections of songs released by the selected artist in the 1970s. The columns may be in a specified order, such as chronologically according to the release date of the album, or alphabetically according to the album title, for example. Within each album column, the songs on that particular album may be listed in some specified order, such as in the order in which the songs appear on the album, alphabetically by the songs' titles, by time duration of the songs, by number of times that the user has listened to the songs previously, by some measure of the songs' commercial popularity, etc. It is also possible for albums, artists and genres to be ordered according to any of the above criteria. Albums released by the selected artist in the 1980s may be represented by the sounds emitted by speaker 122*e*, and albums released by the selected artist in the 1960s may be represented by the sounds emitted by speaker 122*f*.

The user may navigate through the current vertical level, i.e., the artist's albums released in the 1970s, by use of joystick 226 in a manner similar to that described above with reference to FIGS. 5 and 6. Accordingly, the use of joystick 226 to navigate through the matrix depicted in FIG. 7 will not be described in detail herein in order to avoid needless repetition.

In one embodiment, joystick 226 may be used to toggle back and forth through the hierarchy of the matrices of infotainment data. For example, joystick 226 may be capable of being pulled upward into an UP position or pushed downward into a DOWN position. Particularly, in the state depicted in FIG. 7, joystick 226 may be lifted upward to return to the state depicted in FIG. 5. Subsequently, in the state depicted in FIG. 5, joystick 226 may be pushed downward to go back to the state depicted in FIG. 7.

Figure 8:
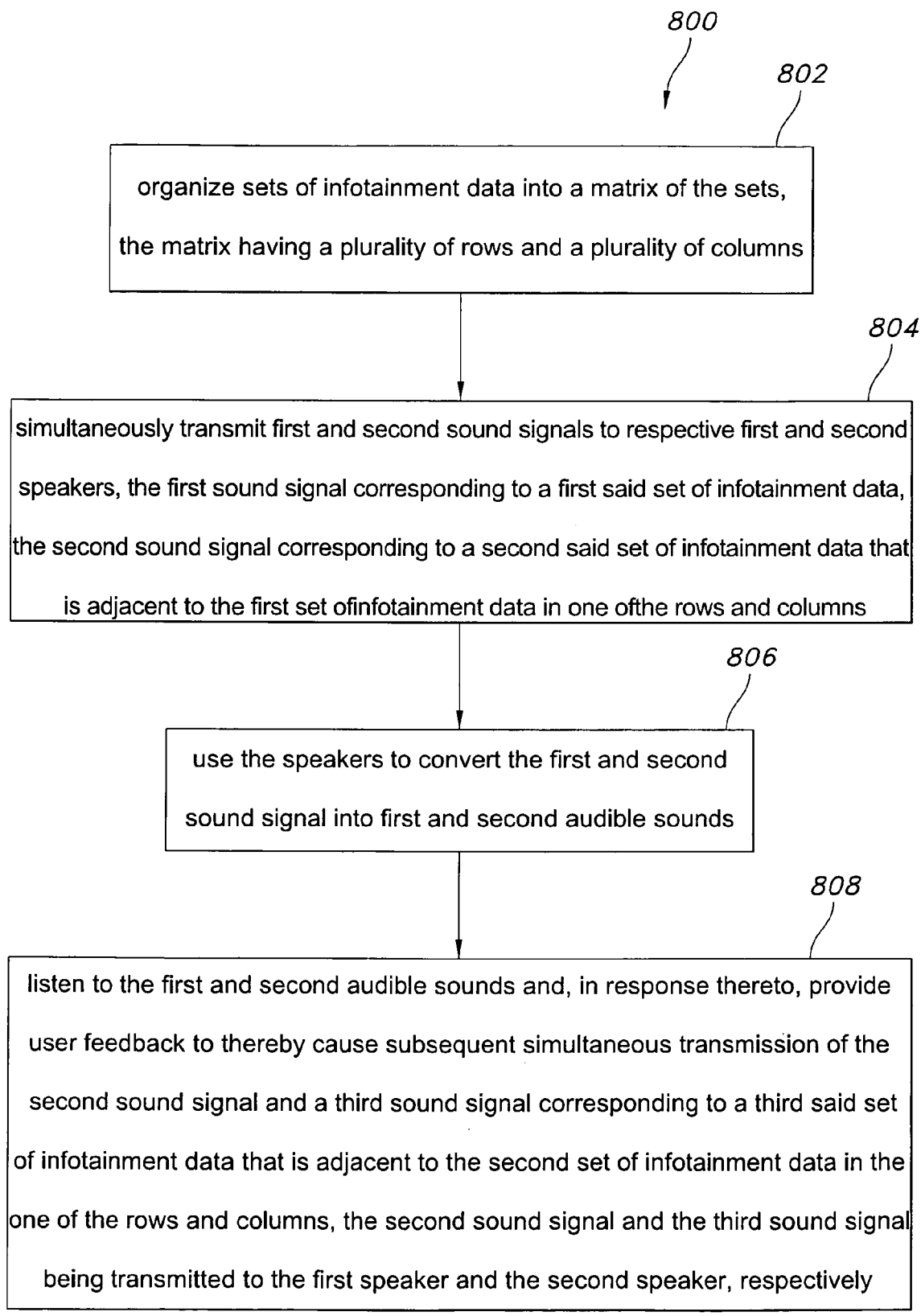
FIG. 8 is a flow chart of one embodiment of a method of the present invention for providing infotainment data Corresponding reference characters indicate corresponding parts throughout the several views. Although the drawings represent embodiments of the present invention, the drawings are not necessarily to scale and certain features may be exaggerated in order to better illustrate and explain the present invention. Although the exemplification set out herein illustrates embodiments of the invention, in several forms, the embodiments disclosed below are not intended to be exhaustive or to be construed as limiting the scope of the invention to the precise forms disclosed.

One embodiment of a method 800 of the present invention for providing infotainment data is illustrated in FIG. 8. In a first step 802, sets of infotainment data are organized into a matrix of the sets, the matrix having a plurality of rows and a plurality of columns. In the example depicted in FIG. 5, infotainment data is in the form of songs is organized into a matrix having vertical levels specifying the decade of release, columns specifying genre of the music, and rows containing sets of albums, wherein each set is performed by a particular artist.

In a next step 804, first and second sound signals are simultaneously transmitted to respective first and second speakers, the first sound signal corresponding to a first set of infotainment data, the second sound signal corresponding to a second set of infotainment data that is adjacent to the first set of infotainment data in one of the rows and columns. For example, an MP3 player, another type of playback device, or an audio signal processor may simultaneously transmit first and second sound signals to speakers 122a, 122b, respectively. The first sound signal may correspond to a set of songs on albums released by Charlie Pride in the 1970s. The second sound signal may correspond to a set of songs on albums released by Dolly Parton in the 1970s. As shown in FIG. 5, the set of songs by Parton is adjacent to the set of songs by Pride in the 1970s Country column due to "Parton" being alphabetically adjacent to "Pride" among the names of 1970s country artists in the infotainment data.

Next, in step 806, the speakers are used to convert the first and second sound signals into first and second audible sounds. Referring still to the embodiment depicted in FIG. 5, speaker 122a may receive the first sound signal and convert it into audible sounds, which may include a voice stating "Charlie Pride" and/or including a snippet of a popular song performed by Charlie Pride, or a song by Charlie Pride that has been selected by the user the most times in the past. Similarly, speaker 122b may receive the second sound signal and convert it into audible sounds, which may include a voice stating "Dolly Parton" and/or including a snippet of a popular song performed by Dolly Parton, or a song by Dolly Parton that has been selected by the user the most times in the past.

In a final step 808, the user may listen to the first and second audible sounds and, in response thereto, provide user feedback to thereby cause subsequent simultaneous transmission of the second sound signal and a third sound signal, the third sound signal corresponding to a third set of infotainment data that is adjacent to the second set of infotainment data in the row or column, the second sound signal and the third sound signal being transmitted to the first speaker and the second speaker, respectively. For example, the user may listen to the audible sounds from speakers 122a-b and, in response thereto, may use joystick 226 to navigate through the matrix of song data. For instance, the user may provide feedback by tilting joystick 226 in direction 264 to thereby cause a shift in the 1970s Country column, a result of which the second sound signal and a third sound signal are simultaneously transmitted to speakers 122a and 122b, respectively. As mentioned above, the second sound signal may correspond to set of songs on albums released by Dolly Parton in the 1970s. Further, the third sound signal may correspond to a set of songs on albums released by Willie Nelson in the 1970s. As shown in FIG. 5, the set of songs by Parton is adjacent to the set of songs by Nelson in the 1970s Country column due to "Parton" being alphabetically adjacent to "Nelson" among the names of 1970s country artists in the infotainment data.

In the embodiment of FIG. 5, sound signals corresponding to Pride and Boston may be simultaneously transmitted to speakers 122a, 122c, respectively. As another example of user feedback in step 808 above, the user may provide feedback by tilting joystick 226 in direction 260 to thereby cause the 1970s Rock column to shift to speakers 122a, 122b, and the 1970s Soul column to shift to speakers 122c, 122d, resulting in a sound signal corresponding to Boston to be transmitted to speaker 122a, and a sound signal corresponding to Franklin to be simultaneously transmitted to speaker 122c. As shown in FIG. 5, the set of songs by Pride is adjacent to the set of songs by Boston in the row indicated by arrow 153. Moreover, the set of songs by Boston is adjacent to the set of songs by Franklin in the row indicated by arrow 153.

The infotainment system creates a virtual three-dimensional sound space through which a user can navigate and make infotainment selections using his/her three-dimensional hearing, without necessarily attending to visual cues and without disrupting visual attention.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. An infotainment system for a vehicle, the vehicle having a body defining an interior space, the infotainment system comprising:
   a playback device configured to:
   receive and process a plurality of sets of infotainment data, said infotainment data being organized in a hierarchy; and
   transmit a plurality of sound signals, each said sound signal corresponding to a respective one of the sets of infotainment data; a plurality of speakers communicatively coupled to said playback device, each said speaker disposed at a different respective location within the interior space, each of said speakers adapted to receive a respective one of the sound signals and convert the respective sound signal into a corresponding audible sound;
   a user interface communicatively coupled to said playback device, said user interface configured to enable a user to navigate between levels of said hierarchy of infotainment data by making selections, wherein each of the selections corresponds to a respective one of the sets of infotainment data; and
   wherein the playback device is configured to transmit the sound signals simultaneously, and the speakers are configured to convert the sound signals into audible sounds simultaneously.

2. The infotainment system of claim 1 wherein the hierarchy includes musical genres and individual songs on different levels of the hierarchy.

3. The infotainment system of claim 1 wherein the hierarchy includes collections of songs and individual songs on different levels of the hierarchy.

4. The infotainment system of claim 3 wherein the collections of songs include one of albums and compact discs.

5. The infotainment system of claim 1 wherein the audible sounds include spoken descriptions of respective ones of the sets of infotainment data.

6. An infotainment system, comprising:
   a playback device configured to:
   process a plurality of sets of infotainment data, the sets of infotainment data being organized in at least one specified order; and
   simultaneously transmit first and second sound signals, said first sound signal corresponding to a first said set of infotainment data, said second sound signal corresponding to a second said set of infotainment data that is adjacent to said first set of infotainment data in the specified order;
   first and second speakers communicatively coupled to said playback device and configured to respectively receive the first and second sound signals and convert the first and second sound signals into first and second audible sounds; and
   a user interface communicatively coupled to said playback device and configured to enable a user to provide feedback and thereby cause said playback device to subsequently simultaneously transmit the second sound signal and a third sound signal, the third sound signal corresponding to a third said set of infotainment data that is adjacent to said second set of infotainment data in the specified order, the second sound signal and the third sound signal being transmitted to the first speaker and the second speaker, respectively.

7. The infotainment system of claim 6 wherein the sets of infotainment data are segregated by at least one of musical genres, album titles, song titles, names of artists, and chronological time periods.

8. The infotainment system of claim 6 wherein the specified order comprises an alphabetical order.

9. The infotainment system of claim 6 wherein the sets of infotainment data are segregated chronologically, and the specified order comprises a chronological order.

10. The infotainment system of claim 6 wherein the user interface is configured to enable the user to highlight the second audible sound before selecting the second audible sound.

11. The infotainment system of claim 6 wherein the audible sounds include spoken descriptions of respective ones of the sets of infotainment data.

12. The infotainment system of claim 6 wherein the first, second and third sound signals correspond to at least one of different songs, different artists, different CDs, different albums, different musical genres, and different chronological time periods.

13. A method of providing infotainment data, said method comprising the steps of:
   organizing a plurality of sets of infotaimnent data into a matrix of the sets, the matrix having a plurality of rows and a plurality of columns;
   simultaneously transmitting first and second sound signals to respective first and second speakers, said first sound signal corresponding to a first said set of infotainment data, said second sound signal corresponding to a second said set of infotainment data that is adjacent to said first set of infotainment data in one of the rows and columns;
   using the speakers to convert the first and second sound signals into first and second audible sounds; and
   listening to the first and second audible sounds and, in response thereto, providing user feedback to thereby cause subsequent simultaneous transmission of the second sound signal and a third sound signal, the third sound signal corresponding to a third said set of infotainment data that is adjacent to said second set of infotainment data in the one of the rows and columns, the second sound signal and the third sound signal being transmitted to the first speaker and the second speaker, respectively.

14. The method of claim 13 wherein the organizing step includes organizing a plurality of discrete sets of infotainment data into a matrix of the sets.

15. The method of claim 13 wherein the rows or the columns are segregated based on one of musical genres, album titles, song titles, names of artists, and chronological time periods.

16. The method of claim 13 wherein the listening step includes listening to the first and second audible sounds simultaneously.

17. The method of claim 13 comprising the further steps of:
   using the speakers to convert the second and third sound signals into second and third audible sounds; and
   listening to the second and third audible sounds and, in response thereto, providing user feedback to thereby cause subsequent simultaneous transmission of the third sound signal and a fourth sound signal, the fourth sound signal corresponding to a fourth said set of infotainment data that is adjacent to said third set of infotainment data in the one of the rows and columns, the third sound signal and the fourth sound signal being transmitted to the first speaker and the second speaker, respectively.

18. The method of claim 13 comprising the further steps of:
   using the speakers to convert the second and third sound signals into second and third audible sounds; and
   selecting one of the second and third audible sounds to thereby navigate to another level of a hierarchy of the infotainment data.

19. The method of claim 13 wherein the organizing step includes organizing a plurality of sets of infotainment data into a three-dimensional matrix of the sets.

* * * * *